(12) United States Patent
Herding et al.

(10) Patent No.: US 6,331,197 B1
(45) Date of Patent: Dec. 18, 2001

(54) SINTERED PLASTIC PARTICLES FILTER ELEMENT

(75) Inventors: Walter Herding, Hahnbach; Wolfgang Raabe, Amberg, both of (DE)

(73) Assignee: Herding GmbH Filtertechnik, Amberg (DE)

( * ) Notice: Subject to any disclaimer, the term of this patent is extended or adjusted under 35 U.S.C. 154(b) by 0 days.

(21) Appl. No.: 09/402,663

(22) PCT Filed: Apr. 9, 1998

(86) PCT No.: PCT/EP98/02110

§ 371 Date: Dec. 8, 1999

§ 102(e) Date: Dec. 8, 1999

(87) PCT Pub. No.: WO98/46327

PCT Pub. Date: Oct. 22, 1998

(30) Foreign Application Priority Data

Apr. 11, 1997 (DE) .............................................. 197 15 196

(51) Int. Cl.$^7$ .................................................. B01D 39/16
(52) U.S. Cl. .................. 55/523; 55/502; 55/524; 55/DIG. 5
(58) Field of Search ........................ 55/486, 487, 495, 55/497, 499, 502, 511, 512, 514, 521, 523, 524, 528, 529, DIG. 5; 95/287

(56) References Cited

U.S. PATENT DOCUMENTS

| 5,158,586 | * | 10/1992 | Layton | 55/523 |
| 5,250,094 | * | 10/1993 | Chung et al. | 55/523 |
| 5,401,406 | * | 3/1995 | Johnson et al. | 55/523 |
| 5,547,481 | * | 8/1996 | Herding et al. | 55/523 |
| 5,564,755 | * | 10/1996 | Ackermann et al. | 55/523 |
| 5,700,373 | * | 12/1997 | Ritland et al. | 55/502 |
| 5,733,452 | * | 3/1998 | Whitlock | 55/523 |

FOREIGN PATENT DOCUMENTS

| 34 13 213 | * | 10/1985 | (DE) | 55/523 |
| 42 11 529 | * | 10/1993 | (DE) . | |
| 44 18 032 | | 12/1995 | (DE) . | |
| 0 250 801 | | 1/1988 | (EP) . | |
| 0 393 374 | | 10/1990 | (EP) . | |
| 0 393 374 | * | 6/1994 | (EP) . | |
| 2 119 674 | * | 11/1983 | (GB) | 55/498 |
| 2 294 468 | * | 5/1996 | (GB) . | |
| 93/19832 | | 10/1993 | (WO) . | |

* cited by examiner

*Primary Examiner*—Duane Smith
*Assistant Examiner*—Jason M. Greene

(57) ABSTRACT

A filter element of sintered-together plastics particles having substantially the shape of a narrow, hollow box with two large, zigzag or corrugated first side walls, two narrow second side walls interconnecting the first side walls, a closed bottom side and an opposite open side, with the peaks and valleys of the first side walls extending in the bottom side to the open side and the filter element, at the open side, having a head for attachment which is elongated and constitutes at least one flow passage, characterized in that the filter element comprises two unified halves each containing one of the first side walls that a foot of synthetic resin is cast on the bottom side, and that the head consists of synthetic resin and is cast on the first and second side walls such that it surrounds with a first part of its heights the first and second side walls on the outside and the projects with a second part of its heights beyond the first and second side walls so as to cover the same at the ends thereof, and in that the head forms in the second part of its height, in the at least one flow passage an, in terms of flow, advantageous transition from the zigzag or corrugated space confined between the two first side walls to a substantially rectangular cross-section of flow.

11 Claims, 2 Drawing Sheets

SINTERED PLASTIC PARTICLES FILTER ELEMENT

BACKGROUND OF THE INVENTION

1. Field of the Invention

The invention relates to a filter element of sintered-together plastics particles having substantially the shape of a narrow, hollow box with two large, zigzag or corrugated first side walls, two narrow second side walls interconnecting the first side walls, a closed bottom side and an opposite open side, with the peaks and valleys of the first side walls extending in the direction from the bottom side to the open side and the filter element, at the open side, having a head for attachment which is elongate and constitutes at least one flow passage.

2. Description of the Related Art

DE 42 11 529 A1 discloses such a filter element, with the head thereof also consisting of sintered-together plastics particles. Such filter elements, which are also referred to as filter pockets or lamella-type filter elements, are suitable in general for separating particles from liquid or gaseous media to be filtered. Particularly preferred fields of use are the separation of solid particles from gaseous media, such a flue gas or air, and the separation of solid particles from liquids or liquid droplets, such as water or oil.

Filter elements are usually employed in filtering apparatus, and the medium to be filtered can flow from the unfiltered gas side of the filtering apparatus through the side walls of the filter elements into the hollow interior thereof, and from there through the flow passage of the head to the clean gas side of the filtering apparatus. The unfiltered gas side and the clean gas side of the filtering apparatus are separated by a partition disposed substantially transversely or horizontally in the filter apparatus, such that the clean gas side is located above the unfiltered gas side. The filter elements are mounted such that the head is "suspended" on the partition. Usually, there are provided several filter elements one after another such that the large, first side walls thereof are disposed substantially parallel to each other with their major plane of extension and with a certain spacing from each other.

The heads of the filter elements are provided with a mounting and reinforcing sheet metal member in order to give them sufficient strength which permits mounting at the heads at all. Furthermore, in the region of the bottom side of the filter elements, there is provided a support in the filtering apparatus, which additionally supports the filter elements by way of a foot rail attached to the bottom side thereof. In practical application, the foot rail is a solid reinforcing rail having in its lower end a downwardly open U-section and being adhered at its upper end into the bottom side of the filter element.

The mounting and reinforcing sheet metal member at the head of the filter element and the additional support of the filter element in downward direction in the filtering apparatus are necessary for the filter element to withstand the loads during operation. Especially in the region of the head, high loads occur at the filter element which are due to the weight of the filter element proper and caused during operation. The filter elements, in specific time intervals or after a preset differential pressure through the filter element has been reached, are cleaned off by a pressurized air blast opposite to the normal filter flow, with the result that particles deposited on the unfiltered gas side of the filter are released from the filter surface and fall down in the filtering apparatus, from where they can be removed. Such cleaning causes oscillations or additional loads caused by the cleaning blast acting on the filter element.

With filter elements of sintered-together plastics particles, the impression so far has been such that an integral manufacture of the head with the remainder of the filter element would lead to the most optimum results, both for reasons of strength and with regard to particularly efficient manufacture. However, there was the disadvantage left that relatively complex shapes are necessary for manufacture, that additional reinforcing parts are necessary on the filter element and that, in particular with longer filter elements, an additional support at the foot of the filter elements is necessary in the filtering apparatus.

SUMMARY OF THE INVENTION

The object of the invention therefore consists in making available a filter element that can be manufactured more easily and does not require additional reinforcing members to be attached, while it nevertheless is of sufficient strength.

According to the invention, this is achieved in case of the known filter element in that the filter element comprises two unified halves each containing one of the first side walls, that a foot of synthetic resin is cast on the bottom side, and in that the head consists of synthetic resin and is cast on the first and second side walls such that it surrounds with a first part of its height the first and second side walls on the outside and projects with a second part of its height beyond the first and second side walls so as to cover the same at the ends thereof, and in that the head forms in the second part of its height, in the at least one flow passage, an, in terms of flow, advantageous transition from the zigzag or corrugated space confined between the two first side walls, to a substantially rectangular cross-section of flow.

The advantage of simple manufacture of the filter element according to the invention becomes apparent here on the one hand by uniting two halves of sintered-together plastics particles, each containing one of the first side walls, to form the filtering portion proper of the filter element, with the result that filter elements of quite different dimensions can be manufactured using one single sintering mould only. The halves just have to be cut to the particular dimensions from a, roughly speaking, plate-shaped configuration of sintered-together plastics particles. Surprisingly, it has turned out that very stable filter elements can be produced from the unstable halves by unifying the same. The direct casting-on of a head and a foot of synthetic resin to the two united halves brings about additional savings since the synthetic resin material is of sufficient strength also without additional reinforcing elements.

It is known that synthetic resin is of higher strength than the porous sintered-together plastics material. However, what is decisive for good strength of the entire filter element, in the light of the separate manufacture of the head from the remainder of the filter element, is the transition from the side walls to the head. According to the invention, the side walls in the upper portion thereof are enclosed from the synthetic resin of the head both from the outside and from their end side. This provides an especially large connecting area between the two materials. Synthetic resin material that has preferably entered the porous material at the connecting areas provides a gradual transition between synthetic resin and sintering material, so that the high strength requirements are fulfilled in particularly good manner. Moreover, the advantageous transition in terms of flow, which is constituted by the zigzag or corrugated space confined between the two first side walls, to the substantially rectangular cross-section of flow in the head, is in the position of transferring the forces from the side walls to the head in all portions of the first side walls in optimum manner, which has a further positive effect on the strength.

It has turned out that a support in the foot region of filter elements according to the invention is not absolutely necessary even in case these are relatively long. Furthermore, it has surprisingly turned out that the filter elements are so stable that they may even be installed in filtering apparatus whose partition, differently from conventional filtering apparatus, is disposed in the housing on edge instead of transversely. The filter elements then are in a mounting position in which, compared to the suspended position, they are rotated by 90° with viewing direction to one of the large first side walls. In this mounting position, too, the filter elements are mounted at the head, with the filter element projecting freely into the unfiltered gas region of the filtering apparatus. It is apparent that particularly high forces act here on the filter element, since in addition to the conventional tensile forces, there are also moment loads occurring.

Casting on of the head provides relatively high design freedom for the head and permits manufacture of the head without any post-machining. Only in this manner is it possible, e.g. already when casting the head, to produce a smooth sealing area requiring no post-machining, and it is possible to cast on or in mounting means such as openings etc. for attachment to the partition and/or a groove for a gasket during manufacture of the head. It is also possible to provide between the substantially parallel long side walls of the head transverse reinforcing walls following the first large side walls. In contrast thereto, the known filter elements required post-machining of the head before attaching the mounting and reinforcing sheet metal member.

Preferably, wall portions of the first side walls are connected to each other between the second, narrow side walls. Preferably, a connection will be made there where peaks or waves of both first side walls are closer to each other. A connection can be made at some or all peaks or waves. The connection can be established by way of connecting webs projecting from the first side walls. Preferably, but not cogently, a connection between head and foot of the filter element is continuous. This connection between the large side walls in the manner of a mutual support increases the stability of the filter element considerably. This reduces specifically also the sensitivity of the large side walls to oscillate during cleaning. In particular for mounting in filtering apparatus having a partition standing on edge, i.e. for "lateral" mounting, it has turned out especially advantageous when the connections between the first side walls are provided substantially at regular intervals and are spaced from each other by a distance between approx. 0.9 to 1.4 times the thickness of the filter element (as measured at the head between the outside of the first side walls). The moment load arising in case of lateral mounting of the filter element can thus be distributed in particularly advantageous manner to individual, smaller filter portions of rectangular cross-section. It is also particularly preferred then to provide transverse reinforcing walls of the head at least for part of the connections between the first side walls. Tensile and pressure forces thus can be introduced into the filter head also in the region of a connection.

A filter element which, in cross-section between head and foot, has in essence the shape of an elongate rectangle with a longitudinal axis has turned out particularly preferred for lateral mounting, in which the zigzag first side walls have first and second wall sections, with the first wall sections extending substantially at right angles to the longitudinal direction and the second walls sections extending at an acute angle with respect to the first wall sections. In particular, the second wall sections extending at an acute angle to the first wall sections may extend from the inner end portions of a first wall section to the outer end portions of the next wall section. It is also possible to provide between the first and second wall sections further, additional wall sections, for example such wall sections extending substantially at right angles to the first wall sections, i.e. parallel to the longitudinal direction. For reasons of stability, it may be preferred to arrange the first wall sections in substantially evenly spaced manner from each other. Mounting of such a filter element can also take place in suspended manner. However, this configuration, which in cross-section has in essence the shape of a fir tree, specifically for lateral mounting provides particularly high strength due to the relatively acute angles between the first and second wall sections and by the first wall sections extending substantially at right angels to the longitudinal axis. It is pointed out that this type of design of the filter elements and related developments as such, without the features or just with part of the features of claim 1, is deemed inventive.

It has turned out that in case of the fir tree structure, angles between the first and second wall sections between approx. 20° and 50°, preferably between approx. 25° and 40°, are particularly advantageous.

The invention will be elucidated in more detail herein after by way of an embodiment shown in the drawings.

BRIEF DESCRIPTION OF THE DRAWINGS

FIG. 1 illustrates a filter element 1 having a foot 3 and a head 5, as seen in viewing direction on one of two large first side walls 7 extending in zigzag or corrugated fashion. Narrow, second side walls 33 laterally join the first side walls 7 to each other so as to form a box-like structure. Furthermore, a partition 9 can be seen that is part of a filtering apparatus, not illustrated in more detail, which separates an unfiltered gas side 11 of the filtering apparatus from a clean gas side 13. Filter element 1 has its head 5 "laterally" mounted to partition 9 disposed on edge, the illustration showing the so-called clean gas side-type of installation of the filter element 1. With this type of installation, the lateral surface of head 5, which projects beyond side walls 7, 33 and is directed towards the foot is mounted abutting the clean gas side of partition 9, and filter element 1 projects through an opening in partition 9. This permits replacement of the filter element 1 from the "clean or filtered" gas side 13. As an alternative, the so-called unfiltered gas side-type of installation of filter element 1 is possible as well. With the latter, head 5 has its lateral surface opposite foot 3 attached in abutting manner on the unfiltered gas side 11 of partition 9. Mounting and demounting in this case take place via the unfiltered gas side. Filter element 1 can also be mounted in suspended manner instead of laterally. Partition 9 then is provided in the manner of an intermediate floor in the filtering apparatus between an unfiltered gas side 11 disposed, for example, at the bottom and a clean gas side 13 disposed at the top. With this suspended installation position of filter element 1, mounting of the filter element either on the clean gas side or on the unfiltered gas side is possible as well. Often, there is not much space left above the filtering apparatus, so that the clean gas side-type of installation of filter element 1 and, thus, changing from the clean gas side cannot be realized. Lateral mounting in connection with clean gas side-type of installation of filter element 1 permits mounting of the filter element 1 from the clean gas side 13, since as a rule there is room available laterally beside filtering apparatus. Between head 5 of filter element 1 and partition 9, a gasket 15 can be seen as sealing means between unfiltered gas side 11 and clean gas side 13.

DETAILED DESCRIPTION OF THE PREFERRED EMBODIMENTS

Figure 1:
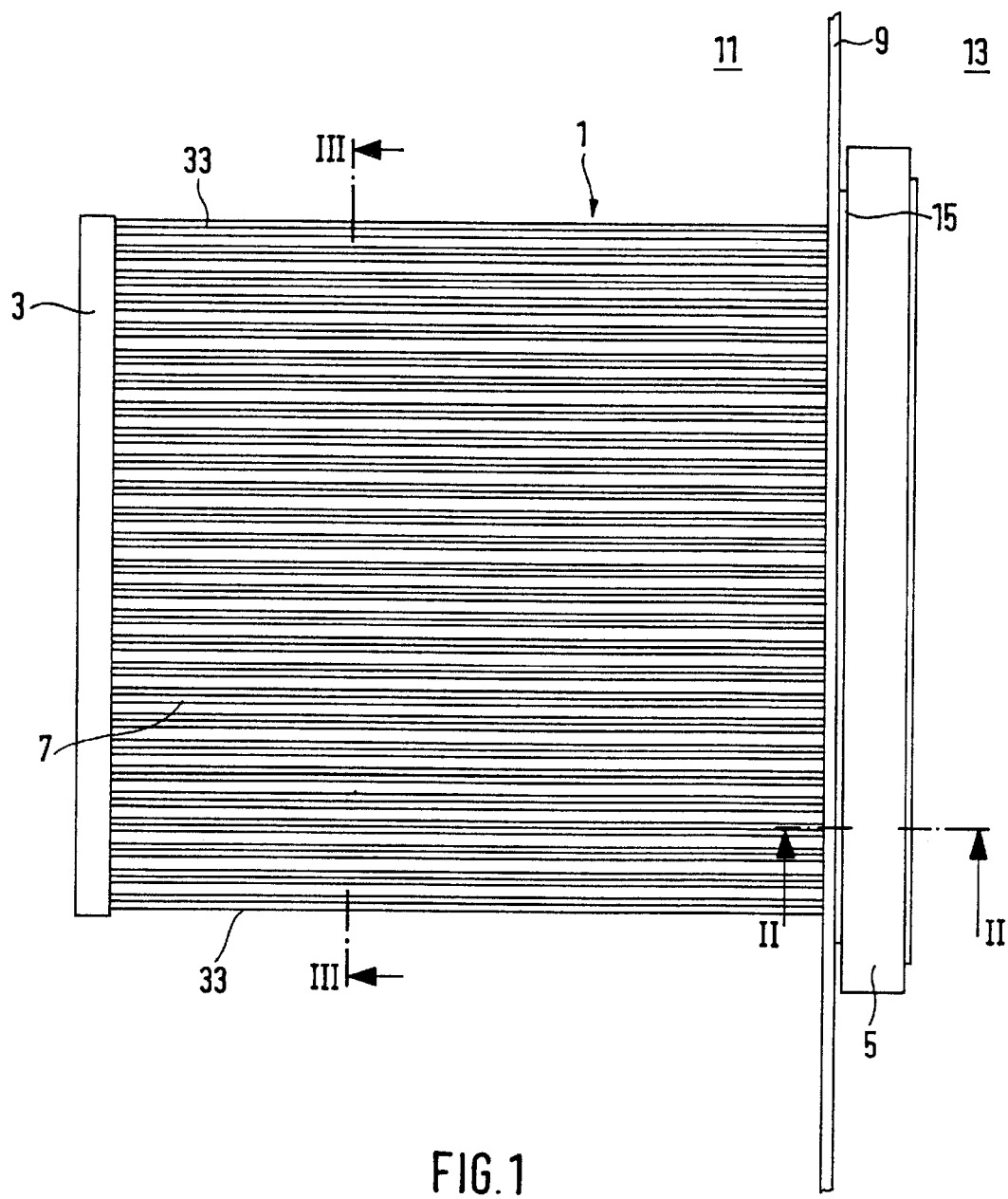
FIG. 1 shows a filter element according to the invention, arranged on a partition disposed on edge.

During operation of the apparatus, the medium to be filtered is sucked in through an opening, not shown, and flows from the unfiltered gas side 11 through porous side walls 7, 33 into the hollow interior of filter element 1, and from there is sucked through a flow passage 19 in head 5 to the clean gas side 13. From there, it is discharged again through an opening, not shown, to outside of the apparatus. The solid particles to be separated from the medium to be filtered are retained by a fine-porosity layer on the surface of filter element 1 and partly adhere thereto. This layer of adhering solid particles is blast off at regular intervals by cleaning (e.g. by a blast of pressurized air opposite to the direction of flow), and drops down on the unfiltered gas side 11 of the apparatus.

Furthermore, it can easily be recognized in FIG. 1 which forces act on filter element 1 with the illustrated lateral type of mounting. Differently from the conventional "suspended" type of mounting of filter element 1 in the filtering apparatus, in which mainly tensile forces are exerted on the transition between head 5 and filter element 1, the projecting arrangement of filter element 1 in case of lateral mounting leads to the application of moment loads, and thus of both tensile and compressive forces at those locations. For example, in the upper region of the transition in FIG. 1 there are mainly tensile forces acting on the transition, whereas in the lower portion there are pressure forces arising at the transition. Especially harmful load peaks may arise during cleaning off, where in addition to the stationary loads there are dynamic loads arising due to the blast of pressurized air, which may cause the system to oscillate and may cause damage in particular at the transition.

Figure 2:
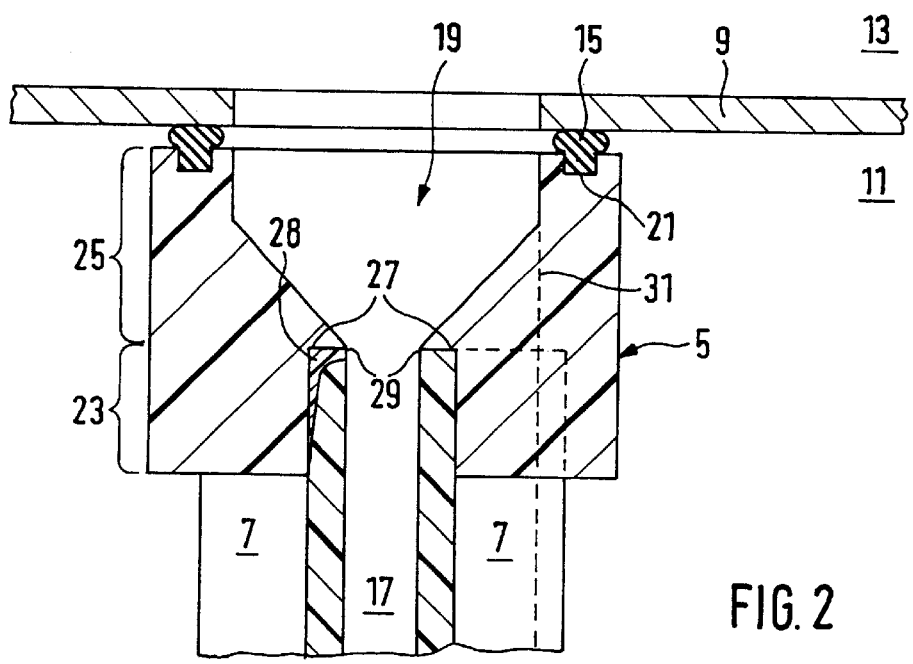
FIG. 2. shows a section through the filter element at the position marked II—II in FIG. 1.

FIG. 2 depicts space 17 confined in zigzag or corrugated fashion between the two first side walls 7, which continues in flow passage 19 and extends through head 5 to clean gas side 13. Depicted is the clean gas side-type of installation. In addition thereto, it is possible to see between partition 9 and head 5 the gasket 15 received in a groove 21 cast in head 5.

The side walls of filter element 1 are porous structures consisting substantially exclusively of sintered together plastics particles, for example of polyethylene. They may also be mixtures of various plastics particles, in particular mixtures of ultra-high-molecular and high-molecular plastics particles. In the sintering process, the particles in the mould are just melted to such an extent that they may connect to each other at their points of contact. The pore size can be controlled by way of the particle size and the process parameters during manufacture of the structures. In addition thereto, on the afflux side of the filter elements there may be applied a finer-porosity coating for example of finer-grain polytetrafluoroethylene particles or fibers or a mixture of particles and fibers, whereby the surface filtration properties can be controlled particularly well and can be matched particularly well to the substances to be filtered. It can easily be seen that with this sintered-together structure of the filter element from particles that are each joined together at their edge portions only, no particularly high capability to withstand loads is present. This holds all the more at those locations where loads occur in locally concentrated manner.

In the transition shown in FIG. 2, side walls 7 are surrounded on the outside by head 5 with a first part 23 of its height, whereas a second part 25 of the height of head 5 extends upwardly beyond side walls 7 and covers the same at the upper ends 27 thereof. The connecting area between side walls 7 and head 5 thus becomes particularly large. For providing a particularly intimate connection between head 5 and side walls 7, the viscosity of the liquid synthetic resin may be chosen such that said resin, due to capillary effect, penetrates to a certain distance into the side walls 7 of coarse porosity. Due to the fact that this capillary effect occurs in different extent depending on the local conditions of the structure, the synthetic resin penetrates the structure to different depths, which leads to a gradual transition between head 5 and the porous structure of side walls 7. This transition range is schematically indicated on the left-hand side of FIG. 2 at reference numeral 28.

FIG. 2 basically shows a section through filter element 1 at a location of filter element 1 where the zigzag first side walls 7 approach each other. However, the right-hand side of the figure, in hatched manner, also shows the outermost wall portion of the pattern located therebehind. It can also be seen how the flow passage 19 merges in a manner advantageous in terms of flow, from a substantially rectangular cross-section of flow in the upper region of head 5 to the interior of filter element 1. The transition takes place from the innermost wall portions obliquely upwardly and outwardly in funnel-shaped manner, whereas it extends from the outermost wall portions in substantially rectilinear manner or with slight inclination only (cf. numeral 31).

Basically any synthetic resin is suitable for casting head 5 and foot 3 to the side walls 7 of the filter element. However, for accelerating manufacture, it is preferred to use fast-curing synthetic resins or also such synthetic resins with which curing can be accelerated considerably by supply of heat.

Figure 3:
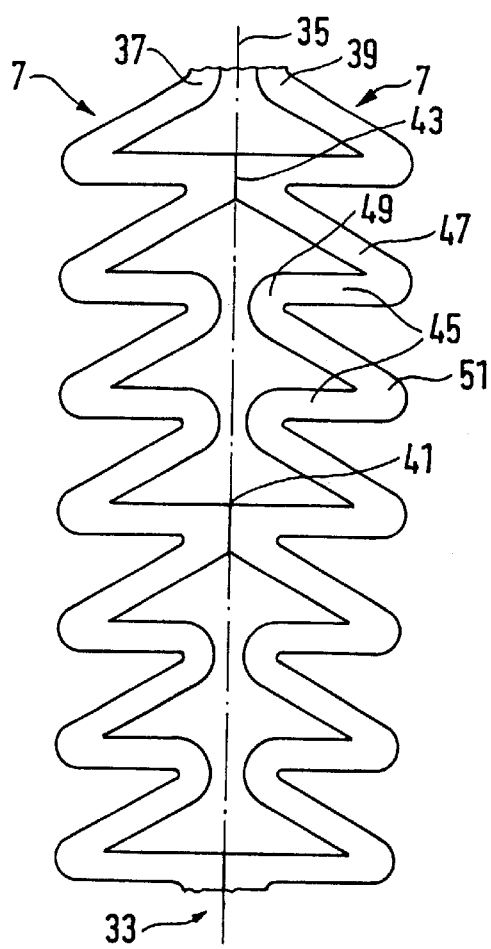
FIG. 3. shows a section through the filter element at the position marked III—III in FIG. 1.

The sectional view of FIG. 3 partly illustrates two first side walls 7 and a narrow, second side wall 33. Furthermore, it can be seen that filter element 1 consists of two halves 37 and 39 united along their longitudinal axis 35. The two halves 37 and 39 may be united by adhering, sintering, welding or different manner. With the aspect of the invention in which the "fir tree-like" shape of filter element 1 is in the foreground, integral manufacture of the filter element 1 is possible as well.

The two halves 37 and 39, in addition to the second narrow side walls 33, are also connected to each other along wall portions 41 and 43, preferably from head 5 to foot 3. This provides a subdivision into smaller box-like elements or cells, thereby increasing the strength of the entire filter element 1 since the individual cells themselves already display relatively high strength.

The first side walls 7 extend in substantially zigzag pattern and are composed of successive first and second wall sections 45, 47 following each other. First wall sections 45 extend substantially in equally spaced manner at right angles to the longitudinal direction 35, and second wall sections 47 extend from the inner end portion 49 of a first wall section 45 to the outer end portion 51 of the next first wall section 45. Filter element 1 in cross-section thus has a substantially fir-tree-like configuration. The first wall sections 45 extending at right angles to the longitudinal axis provide for particularly high rigidity of the first side walls 7 at right angles to longitudinal axis 35, which in particular with lateral mounting of the filter element 1 can effectively prevent buckling or bulging of the first large side walls 7. The second wall sections together with the first wall sections form a relatively acute angle preferably in the range of approx. 30°, which further enhances rigidity.

In the preferred installation position with lateral mounting, the second wall sections 47, in the sectional view of FIG. 3, extend from the inside outwardly and downwardly, so that particles are not so easily deposited thereon during filter operation. Also during cleaning off, the flow component is substantially at right angles to the second wall sections 47, so that the particles are blown away from longitudinal axis 35 towards the outside during cleaning off.

In addition thereto, the preferred flow direction in case of lateral mounting is from the top towards the bottom along the filter element 1, so that the oblique arrangement of the second wall sections 47 yields particularly good afflux conditions to these second wall sections 47.

What is claimed is:

1. A filter element of sintered-together plastics particles having substantially the shape of a narrow, hollow box with two large, zigzag or corrugated first side walls, two narrow second side walls interconnecting the first side walls, a closed bottom side and an opposite open side, with the peaks and valleys of the first side walls extending in the direction from the bottom side to the open side and the bottom side being further provided with a foot, and the filter element, at the open side, having a head for attachment which is elongate and constitutes at least one flow passage, wherein:

the filter element comprises two unified halves each containing one of the first side walls, the head and the foot are cast on of synthetic resin, with the head being cast on the first and second side walls such that the head surrounds with a first part of its height the first and second side walls on the outside and projects with a second part of its height beyond the first and second side walls so as to cover the ends thereof, and the head forms in the second part of its height, in the at least one flow passage, a transition from the zigzag or corrugated space confined between the two first side walls to a substantially rectangular cross-section.

2. The filter element of claim 1, wherein the head has formed thereon at least one of mounting means and a groove for a gasket.

3. The filter element of claim 1, wherein the head, as seen in a plan view in viewing direction towards the bottom side, is of elongate configuration with mutually substantially parallel long side walls which are supported with respect to each other by at least one transverse reinforcing wall.

4. The filter element of claim 1, wherein the zigzag or corrugated pattern of the first side walls is a mirror image to a plane of symmetry between the first side walls.

5. The filter element of claim 1, wherein wall portions of the first side walls are connected to each other between the second, narrow side walls.

6. The filter element of claim 5, further comprising a transverse reinforcing wall of the head provided at a location where there is also formed a connection between the first side walls.

7. The filter element of claim 5, wherein the connections between the first side walls are disposed substantially at regular intervals and are spaced from each other by a distance of between about 0.9 to 1.4 times the thickness of the filter element.

8. The filter element of claim 1, wherein the filter element, in a cross-section between head and foot, has substantially the shape of an elongate rectangle having a longitudinal axis, and the zigzag first side walls have first and second wall sections, with the first wall sections extending substantially at right angles to the longitudinal direction and the second wall sections extending at an acute angle to the first wall sections.

9. The filter element of claim 8, wherein the angle between the first and second wall sections is in the range of 20° to 50°.

10. The filter element of claim 1, wherein a finer-pore coating is provided on the afflux side of the filter element.

11. The filter element of claim 8, wherein the angle between the first and second wall sections is in the range of 25° to 40°.

* * * * *